April 29, 1952  G. T. BRAITHWAITE  2,594,620
DETACHABLE AND RELEASABLE CONNECTOR FOR FISHING SINKERS
Filed June 27, 1950

INVENTOR.
George T. Braithwaite,
BY
James N. Lyle
ATTORNEY.

Patented Apr. 29, 1952

2,594,620

UNITED STATES PATENT OFFICE 2,594,620

DETACHABLE AND RELEASABLE CONNECTOR FOR FISHING SINKERS

George T. Braithwaite, Miami, Fla.

Application June 27, 1950, Serial No. 170,665

1 Claim. (Cl. 43—43.12)

This invention relates to an improved device for detachably and releasably connecting sinkers to fishing lines.

It is an object of the present invention to provide a preformed connector constructed in such a manner that it can be quickly and easily threaded through the usual opening of a lead sinker and which will retain the sinker against accidental displacement or loss under normal conditions and which can be just as easily detached from the sinker when a heavier or lighter sinker is desired or which, when the sinker becomes snagged in rocks or the like, will release itself when sufficient pressure is placed upon the fishing line, thus avoiding loss of tackle, such as the usual swivels, hooks and leaders, should the line be broken.

Sinkers have heretofore been tied upon the leader, usually through the medium of a swivel and it frequently becomes necessary to change the sinker, due to various water conditions and, when the sinker has been tied on, either means that the line adjacent the sinker is cut, or an effort made to untie the line, resulting in a considerable loss of time and energy. The device of the present invention contemplates a connector formed of preferably spring wire that is first inserted through one eye of a swivel and then inserted through the opening of the sinker and, emerging from the opposite end of the sinker, will spread and firmly grip the lower end of the sinker in a manner to prevent accidental disengagement through normal use, while the construction is such that the projecting ends of the device can be pressed together and withdrawn through the opening of the sinker without catching upon the sides of the opening.

Further, the connector is such, that when the sinker is firmly snagged in rocks, logs or other underwater obstructions, the flexibility of the wire will permit distortion of the spread ends to permit the withdrawal of the connector from the snagged sinker without danger of losing the swivel or leader and possibly the hooks should the line be broken when an attempt is made to force the sinker loose.

A further object of the invention resides in the extreme simplicity of the device, low cost of manufacture and the efficient and highly desirable operation thereof.

Other novel features of the device will be readily apparent during the course of the following description, reference being had to the accompanying drawings, wherein has been illustrated a preferred example thereof and wherein like characters of reference denote like parts throughout the several figures.

Figure 1:
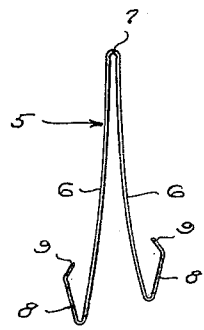
Figure 1 is a perspective view of the connector.

Referring specifically to the drawings, the numeral 5 denotes the connector as a whole, embodying a length of spring wire bent upon itself to form a pair of outwardly curved legs 6, extending from a head 7. Each leg 6 has its lower end bent upon itself to provide outwardly inclined arms 8, the terminal ends of which are bent inwardly at an angle, as at 9. The several bends are formed upon an arc to avoid any sharp corners or ends that would be likely to catch upon the inner wall of the tubular opening 10, formed in the sinker 11. The sinker 11, as here illustrated, is generally oval in shape and the opening 10 extends entirely therethrough. Any well known type of swivel 12 is preferably employed at the end of the usual leader of the fishing line, not shown, and serves as a convenient means for the attachment of the sinker.

Figure 2:
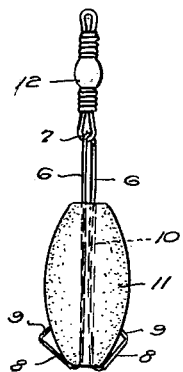
Figure 2 is a side elevation of a sinker, showing the connector applied thereto.
Figure 3:
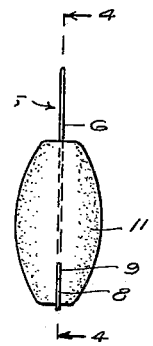
Figure 3 is a view at right angle to Figure 2.
Figure 4:
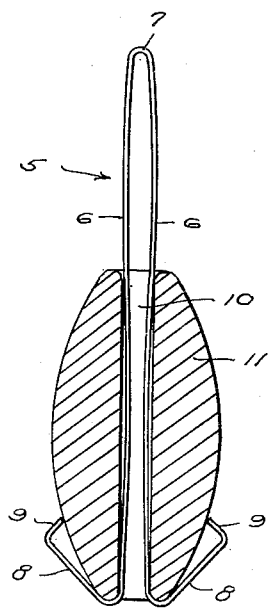
Figure 4 is a vertical section taken on line 4—4 of Figure 3.
Figure 5:
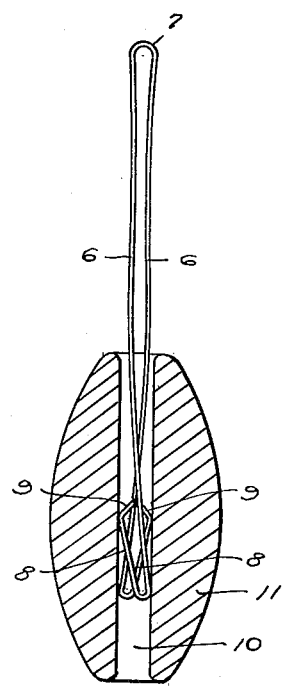
Figure 5 is a view similar to Figure 4, showing the connector being either inserted or withrawn from the sinker.

In the use of the device, a sinker 11 of the desired weight is selected. A connector 5 is then inserted through the eye of the swivel, to be suspended at the head 7. The legs of the connector 6, are then pressed together and jointly inserted into the opening 10 of the sinker and forced therethrough until their terminal ends project from the opposite end. Immediately upon leaving the opening 10, the legs expand outwardly and the operator then reverses the movement of the connector, which action causes the arms and their terminal ends 9 to engage and grip the outer sides of the sinker, as clearly shown in Figures 2 and 4. Thus, the sinker is securely held against displacement under all normal conditions. Should the sinker become snagged in rocks or other underwater obstructions, an effect is naturally made to release it, without breaking the line or leader. Since the connector is formed of spring wire of a predetermined tension, a continuous and increased pull upon the line will cause the arms to bend downwardly and permit the connector to be withdrawn from the snagged sinker, thus avoiding loss of tackle.

When it is desired to replace the sinker with either a lighter or heavier one, the operator forces the connector downwardly until the arms 8 can be depressed inwardly, at which time the sinker is shifted downwardly until the terminal ends 9 jointly engage in the opening 10. At this time, the connector can be bodily withdrawn and the angularity of the ends 9 are such that the generally sharp ends thereof will be prevented from catching upon the inner wall of the opening 10. Upon removal or insertion, the legs 6 and their arms 8 will spring outwardly to their normal shape.

It will be apparent, that a very novel and highly desirable form of connector has been provided for quickly and easily attaching or detaching the conventional fishing sinker with a minimum of effort. The device is extremely cheap to manufacture and results in a considerable saving in the cost of lost fishing tackle when sinkers become hopelessly snagged.

It is to be understood, that the invention is not limited to the precise shape or material, but includes within its purview, whatever changes fairly come within the spirit or the scope of the appended claim.

Having described my invention, what I claim as new and desire to secure by Letters Patent is:

A spring wire connector for detachably connecting a sinker to a fishing line, that comprises a pair of identical divergent legs connected by a rounded head, the lower ends of the legs bent upwardly to provide a pair of identical outwardly divergent gripping arms the terminal ends of which are bent inwardly to provide rounded portions, the connector adapted for use with oval type sinkers having an axial opening therethrough, the legs and arms adapted to be compressed and inserted through the opening to project and expand below the sinker laterally to cause the arms to overlie the body of the sinker and have gripping contact therewith when the connector is shifted in reverse motion, the bending of the arms presenting rounded portions that permit uninterrupted sliding movement of the connector through the opening of the sinker in either an attaching or detaching motion of the connector.

GEORGE T. BRAITHWAITE.

REFERENCES CITED

The following references are of record in the file of this patent:

UNITED STATES PATENTS

| Number | Name | Date |
| --- | --- | --- |
| 1,232,167 | Arnold | July 3, 1917 |
| 1,564,147 | Stickley et al. | Dec. 1, 1925 |
| 2,392,648 | Cushman | Jan. 8, 1946 |
| 2,473,089 | Barone | June 14, 1949 |